United States Patent [19]

Eckberg

[11] 4,262,107

[45] Apr. 14, 1981

[54] RHODIUM CATALYZED SILICONE RUBBER COMPOSITIONS

[75] Inventor: Richard P. Eckberg, Round Lake, N.Y.

[73] Assignee: General Electric Company, Waterford, N.Y.

[21] Appl. No.: 81,966

[22] Filed: Oct. 4, 1979

Related U.S. Application Data

[63] Continuation of Ser. No. 932,068, Aug. 8, 1978, abandoned.

[51] Int. Cl.³ .............................................. C08G 77/06
[52] U.S. Cl. ...................... 528/15; 528/31; 528/34; 528/901; 427/387; 427/391; 427/392; 428/392
[58] Field of Search .................. 528/15, 31, 34, 901; 427/387, 391, 392; 428/392

[56] References Cited

U.S. PATENT DOCUMENTS

| | | | |
|---|---|---|---|
| 3,922,443 | 11/1975 | Brown et al. | 528/15 |
| 3,928,629 | 12/1975 | Chandra et al. | 427/387 |
| 4,026,835 | 5/1977 | Lee et al. | 260/37 SB |
| 4,066,594 | 1/1978 | Moeller | 260/29.2 M |
| 4,071,644 | 1/1978 | Grenoble | 427/302 |

*Primary Examiner*—Melvyn I. Marquis
*Attorney, Agent, or Firm*—E. Philip Koltos; J. L. Young; M. J. Doyle

[57] ABSTRACT

A silicone rubber composition with a good shelf life and fast curing at elevated temperatures comprising a silanol end-stopped diorganopolysiloxane polymer, a silicone hydride and a rhodium complex catalyst in combination with an inhibitor compound selected from low molecular weight silanol end-stopped diorganopolysiloxanes, acetylenic compounds, olefinic carboxylic acid esters of aliphatic alcohols, alkenyl isocyanurates and mixtures of the above inhibitor compounds. The above compositions are especially suited as release coatings for plastic and cellulosic subtrates including paper.

31 Claims, No Drawings

RHODIUM CATALYZED SILICONE RUBBER COMPOSITIONS

This application is a continuation of parent application Ser. No. 932,068 filed on Aug. 8, 1978 and now abandoned.

BACKGROUND OF THE INVENTION

The present invention relates to SiH Rhodium catalyzed composition and more particularly the present invention relates to SiH rhodium complex catalyzed compositions in which there is present an inhibitor compound which gives the composition good shelf life and allows it to cure at elevated temperatures in a short period of time. Release coatings for cellulosic substrates such as paper release coatings, as well as release coatings for plastic and metal substrates are well known. The substrate whether it be paper or a layer of plastic is coated with a release coating so that adhesive materials will stick to the substrate with great difficulty. One use of such paper release coatings and plastic release coatings is to utilize the paper release coated material for pressure sensitive adhesives. The paper release material is simply applied over the pressure sensitive adhesive allowing the article to be wound, and sold in that manner. For instance the paper release article may be applied as an interlayer over pressure sensitive adhesive tape to allow the tape to be rolled up. When it is desired to utilize the tape, the paper release layer is simply stripped off and the pressure sensitive adhesive tape is made to be used. The paper release layer can be removed from the pressure sensitive adhesive without a great deal of difficulty because of the paper release coating on the paper. Such coatings can be applied for similar uses on plastic and metal substrates. It has been found that for such uses silicone paper release coatings are especially suitable. The advantages of silicone paper release coatings are that they tend to be relatively non-toxic, have good high temperature stability and resistance to ultraviolet rays and also have good release properties. Of the silicone paper release coatings, two types had found wide usage, that is a paper release coating comprising the reaction product of a vinyl containing polysiloxane, a silicone hydride and a platinum catalyst and a paper release coating which is the reaction product or the cured product of a silanol containing polysiloxane, a silicone hydride and a tin catalyst. To be utilized in the commercial coating of paper, such paper release coatings have to be able to have a pot life of 12 hours or more, that is the material should not increase in viscosity more than 50% at room temperature over a 12 hour period and should cure in generally 5 to 60 seconds and more preferably 5 to 30 seconds at a temperature in the range of 300° to 500° F.

Traditionally, such compositions, that is either the platinum catalyzed compositions or tin catalyzed compositions, were applied in the form of a solution or a water based emulsion on the paper or substrate to be rendered releasable. For the tin system, such was a necessity since the desired shelf life could not obtained with the tin system, unless the composition was diluted in water or a solvent. Without dilution the tin system would generally cure or jell up in the container after being mixed prior to application to the paper in a relatively short period of time, typically less than an hour.

It should be noted that it was also envisioned utilizing the system consisting of a silanol-containing polysiloxane, silicone hydride crosslinking agent and a platinum catalyst. However, in such a system it was desirable to use a tin catalyst since it is considerably less expensive than the platinum catalyst.

With respect to the vinyl system, which was cured with a platinum catalyst, such a system in an emulsion form worked appropriately. An Example of a vinyl system which is cured with a platinum catalyst is for instance to be found in Moeller U.S. Pat. No. 4,066,594. However, the solvent and water-based emulsion systems for paper release coatings have two main disadvantages. With respect to the solvent systems, the evaporation of a solvent was required when the system was cured which solvent could not be released to the atmosphere in certain geographical areas due to pollution control requirements. As a result such solvent systems required the use of expensive equipment to collect the solvent as it was evaporated such that it would not be released to the atmosphere. With respect to the emulsion water-based systems in order for such systems to be cured, the water had to be evaporated first at high oven temperatures; only then the system would undergo the desired crosslinking reaction. Such evaporation of the water carrier resulted in the expenditure of a large amount of energy. Accordingly, at present there is an emphasis on desirably utilizing in paper release applications silicone systems which do not utilize a solvent or do not utilize a water carrier and in which the silicone system is applied at 100% solids. An example of a solvent-less silicone system which is disclosed to be utilized at 100% solids and which can be cured with a platinum catalyst or in the case of the silanol system with a tin catalyst is to be found in Grenoble U.S. Pat. No. 4,071,644.

In the case of the vinyl system disclosed in the foregoing Grenoble U.S. Pat. No. 4,071,644, most platinum catalysts are sufficient to cure the system at 100% solids. In the case of the silanol system which is cured with a silicon hydride it has been found that most platinum catalysts will effectively cure the system at elevated temperatures at a rapid enough rate to be commercially acceptable. On the other hand, the tin catalyst which will cure the system at an effective enough rate is undesirable in that in spite of all inhibitors that may be added to such a system, the system still does not have so long a shelf life as would be commercially desirable, that is a shelf life of 12 to 24 hours without gelling. It should be noted that the silanol system, that the system containing a silanol-containing polysiloxane, silicone hydride and a platinum or tin catalyst system is to be preferred over the vinyl system which is cured with a platinum catalyst since the silanol polysiloxane is much cheaper and easier to produce than the vinyl-containing polysiloxane. Accordingly, a number of attempts have been made to arrive at a good 100% solids silanol SiH paper release coating system with the appropriate cure rate at elevated temperatures and with good pot life at room temperature. In U.S. Pat. No. 3,992,433 there is disclosed a silanol polysiloxane SiH system for paper release coating utilizing a specific platinum catalyst as disclosed in the patent and specifically in Column 2. The large number of platinum catalysts disclosed in that patent, most of such platinum catalyst which are quite complex, will not cure the 100% solids silanol system at a sufficient rate at elevated temperatures. Accordingly, it was desirable to find an alternate catalyst and an inhibitor system which would result in a silanol system with good pot life at room temperature but with optimum curing speed at elevated temperatures, that is in the temperature range of 300° to 500° F. for a curing period varying from 5 to 60 seconds. It is also desirable not to be totally dependent on a few specific platinum catalysts as catalysts for silanol silicone hydride paper release coating systems. Recently, as disclosed in U.S. Pat. No. 3,928,629, rhodium complex catalysts have been disclosed as catalysts for vinyl polysiloxane, silicone hydride paper release coating systems. As stated in that patent, the rhodium complex catalyzed vinyl systems have desirable shelf life without an inhibitor and will cure the system at commercial paper coating rates. Another recent disclosure is U.S. Pat. No. 4,026,835, which it is disclosed that rhodium complex catalysts may be utilized as catalysts in the production of silicone foams by the reaction of silanol containing polysiloxanes with silicone hydrides.

It should be noted that with respect to the vinyl containing polysiloxane systems which were cross-linked with a silicone hydride and catalyzed with a rhodium complex, that such systems were not found to have as desirably as long a shelf life without an inhibitor. The types and kinds of inhibitors are not disclosed or discussed in U.S. Pat. No. 3,928,629. In addition U.S. Pat. No. 4,026,835 does not discuss whether that system that is disclosed in that patent could be applied to other than the production of silicone foams. Accordingly, it was highly desirable to be able to devise 100% solids silanol containing polysiloxane, silicone hydride rhodium complex catalyzed systems which would have a good pot life at room temperature and which would cure the silanol system at a sufficient rate of time in commercial coating techniques.

Accordingly, it is one object of the present invention to provide for 100% solids silanol SiH coating system.

It is another object of the present invention to provide for a solventless silanol SiH system which is catalyzed with a rhodium complex. It is an additional object of the present invention to provide for a 100% solids paper release coating system comprising a silanol polymer, silicone hydride, and a rhodium complex and an inhibitor compound, such that the system would have a good pot life at room temperature and cure at a sufficient rate at elevated temperatures.

It is yet another object of the present invention to provide 100% solids release coating composition comprising a silanol containing polymer, a silicone hydride, a rhodium complex and an inhibitor compound, a low molecular weight silanol containing diorganopolysiloxane polymer.

These and other objects of the present invention are accomplished by means of the disclosures set forth hereinbelow.

SUMMARY OF THE INVENTION

In accordance with the above object, there is provided by the present invention a silicone rubber composition with a good pot life at room temperature and rapid curing at elevated temperature comprising:
(a) 100 parts by weight of a silanol endstopped diorganopolysiloxane polymer having 100 to 1,000 centipoise viscosity at 25° C. where the organo groups are selected from the class consisting of alkyl radicals, fluoroalkyl radicals of 1 to 8 carbon atoms and mixtures thereof
(b) from 1–20 parts by weight of a silicone hydride having from 0.5 to 1.6% by weight of hydrogen and a viscosity varying from 5 to 200 centipoise at 25° C. (c) from 10 to 500 parts per million as rhodium metal of a rhodium complex catalyst; and (d) from 0.1 to 10 parts by weight of an inhibitor compound selected from the class consisting of:
(1) a silanol endstopped diorganopolysiloxane having from 5.5 to 14.1% by weight of silanol, a viscosity of 20 to 80 centipoise at 25° C. where the organo groups are alkyl radicals of 1 to 8 carbon atoms; (2) alkyl maleates where the alkyl radical contains from 1 to 8 carbon atoms; (3) compounds containing acetylenic groups; (4) olefinic carboxylic acid esters of aliphatic alcohols where the aliphatic alcohols contain from 1 to 4 carbon atoms and the olefinic carboxylic acid group contains from 3 to 10 carbon atoms; (5) alkenyl isocyanurates wherein the alkenyl group contains from 3 to 8 carbon atoms, and mixtures of the above inhibitor compounds. The silicone hydride compound may either be a linear low molecular weight hydrogen containing polysiloxane or it may be a cyclicpolysiloxane containing hydrogen groups. The preferred rhodium complex catalyst is one of the formula Rh $X_3$ $(R_2S)_3$ where R is an alkyl radical that has from 4 to 12 carbon atoms and X is selected from the class consisting of chlorine and bromine; and is more preferably chlorine. Preferably the R group is an alkyl radical from 4 to 8 carbon atoms; above 12 carbon atoms the complex tends to be unstable.

The preferred inhibitor compounds are the linear silanol endstopped dimethylpolysiloxane having a viscosity of 25–60 centipoise at 25° C., diethylmaleate, diethylacetylenedicarboxylate, vinyl acetate, triallylisocyanurate and mixtures of the foregoing inhibitor compounds. The preferred inhibitor compound mixture is diethylmaleate mixed with a linear silanol endstopped dimethylpolysiloxane polymer having a viscosity of 25 to 40 centipoise at 25° C. and a silanol content varying from 7.3 to 14.1% by weight. It should be noted that an essential part of the invention of the instant case is the use of the inhibitor compound in the compositions disclosed above. Without the inhibitor compounds and ingredients disclosed above the composition will not have a sufficient potlife at room temperature after all the ingredients are mixed together for commercial purposes. With the inhibitor compounds of the instant case, the composition will have a useful pot life of 12 to 24 hours; that is in at least a 12 hour period, the viscosity increase of the composition would only be 50% or less. Such compositions are especially suited as paper release coatings. In addition, such compositions will cure in a period of time varying from 5 to 60 seconds and more preferably from 5 to 30 seconds at a temperature in the range of 300° to 500° F. which is the temperature and time period for commercial paper release coating procedures.

DESCRIPTION OF THE PREFERRED EMBODIMENT

The basic ingredient in the release coating compositions of the instant case comprises a silanol endstopped diorganopolysiloxane polymer having a viscosity varying from 100 to 10,000 centipoise at 25° C. and more preferably having a viscosity varying from 100 to 1,000 centipoise at 25° C. Most preferably the viscosity of the silanol endstopped diorganopolysiloxane polymer varies from 300 to 1,000 centipoise at 25° C. The organo groups of the diorganopolysiloxane polymer may be selected from any organo groups normally associated with such polymers other than vinyl and phenyl. More generally, the organo groups of such diorganopolysiloxane polymer is selected from alkyl radicals of 1 to 8 carbon atoms and fluoroalkyl radicals of 3 to 8 carbon atoms and mixtures thereof. Most preferably, the organo groups are alkyl radicals of 1 to 8 carbon atoms such as methyl, ethyl, or propyl, etc. The most preferred substituent alkyl radical is methyl. The diorganopolysiloxane polymer is preferably linear with only a very minor amount of trifunctionality being permissible in the polymer.

Generally, there may be about or up to 1% by weight in the linear polymer of combined monofunctional and trifunctional siloxy groups in the polymer. When there is more than this amount of trifunctionality or monofunctionality in the silanol terminated diorganopolysiloxane polymer, then its catalyzed pot life is not as good as is desired. By good pot life, it is meant that the final mixed composition will increase in viscosity at the most by 50% in at least a 12 hour period. The formula for the linear diorganopolysiloxane polymer may be represented in many ways, but most preferably it is represented as follows:

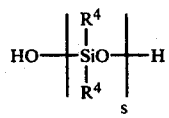  (1)

where $R^4$ is selected from alkyl radicals and fluoroalkyl radicals from 1 to 8 carbon atoms and mixtures thereof: and s varies such that the polymer has a viscosity varying from 100 to 10,000 centipoise at 25° C. and more preferably has the viscosity varying from 100 to 1,000 centipoise at 25° C.

Per 100 parts of the silanol endstopped diorganopolysiloxane polymer, there is utilized anywhere from 1 to 20 parts by weight of a silicone hydride as a cross-linking agent and more preferably anywhere from 1 to 10 parts by weight of a silicone hydride. The silicone hydride generally has hydrogen content varying anywhere from 0.5 to 1.6% by weight and a viscosity varying from 5 to 200 centipoise at 25° C. More preferably the hydride content of the silicone hydride varies from 0.6 to 1.3% by weight and the hydride has the viscosity varying from 5 to 100 centipoise at 25° C. The silicone hydride may be any silicone hydride which is useful in SiH platinum catalyzed compositions. For instance a silicone resin having hydrogen substituent groups and composed of monofunctional siloxy units and tetrasiloxy units may be utilized as a hydride cross-linking agent in the present composition. However, with the use of such a silicone resin the optimum pot life and the rapid cure rate at elevated temperatures is not obtained. In addition, the composition does not have as low release properties as would be desired.

Accordingly and generally there is preferred to be utilized as a silicone hydride in the compositions of the instant case a silicone hydride having the formula;

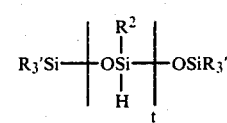  (2)

where R' is selected from the class consisting of alkyl radicals of 1 to 8 carbon atoms and $R^2$ is an alkyl radical of 1 to 8 carbon atoms or a fluoroalkyl radical of 3 to 8 carbon atoms such as 3, 3, 3 trifluoropropyl and t varies such that the polymer has a viscosity varying from 5 to 200 centipoise at 25° C. and more preferably has a viscosity that varies from 5 to 100 centipoise at 25° C. The linear silicone hydride of the above formula will work very effectively as a cross-linking agent in the release coating compositions of the instant case.

An alternative to such linear hydrogen-containing polysiloxanes as cross-linking agents is cyclicpolysiloxanes containing hydrogen groups. Accordingly, within the above concentration of 1–20 parts and preferably 1–10 parts by weight of the silicone hydride per 100 parts by weight of the linear silanol end-stopped base diorganopolysiloxane polymer there may be utilized a silicone hydride of the formula, $$(R^3H\ SiO)_4 \qquad (3)$$

where $R^3$ is an alkyl radical of 1 to 8 carbon atoms.

Both the cyclicpolysiloxane and the linear silicone hydride are good cross-linking agents for the compositions of the instant case. However, the linear hydride polysiloxane is preferred as the cross-linking agent since it imparts better pot life to the mixed composition. The linear silicone hydride and the cyclic silicone hydride can be obtained by well-known techniques. The silicone hydride of Formula 2 can simply be obtained by hydrolyzing the appropriate hydrogen, organo, dichlorosilanes with the appropriate triorganochlorosilanes as chainstoppers by selecting the proper proportion of the dichlorosilane to the mono chlorosilanes which will determine the viscosity and accordingly, the final molecular weight of the silicone hydride of Formula 2. Such hydrolysis may be carried out in the presence of an organic solvent so as to more carefully regulate the hydrolysis reaction, however, such a solvent is not strictly necessary. Once the appropriate chlorosilanes have been hydrolyzed then the organic solvent utilized can be separated by decantation and the excess water can also be separated by decantation. The hydrolyzate may then be washed with water to remove excess acid or the excess acid may be removed by heating the hydrolyze. The silicone hydride of Formula 2 may finally be obtained in relatively pure form by distillation techniques. However, normally such distillation separation techniques are not utilized and the silicone hydride of Formula 2 is obtained as this hydrolyzate after the hydrolyzate has been treated to reduce the acidity to the proper level. The hydride polysiloxane cross-linking agent of Formula 3 is also obtained by well-known procedures.

Briefly, the appropriate organo dichlorosilane is hydrolyzed in water. The hydrolyzate is then taken and the excess water separated from it and there is added to the hydrolyzate anywhere from 100 parts per million to 1,000 parts per million of KOH and the hydrolyzate is heated at elevated temperatures so as to preferentially distill overhead the organohydrogen cyclotetrapolysiloxane. Utilizing such a method the yield of the hydrogen tetracyclopolysiloxane can be maximized and such a compound can be obtained in a relatively pure form for utilization as a cross-linking agent in the compositions of the instant case.

The silanol endstopped diorganopolysiloxane base polymer can also be obtained by a simple and direct technique. Thus, the appropriate diorganodichlorosilanes are hydrolyzed in water. Then hydrolyzate is then taken and the excess water removed therefrom. To this hydrolyzate is added the appropriate quantities of potassium hydroxide and the resulting mixture is heated at elevated temperatures so as to preferentially form and have removed by distillation procedure a diorganotetracyclopolysiloxane. The cyclipolysiloxanes may then be taken and to them added to chainstoppers the appropriate quantities of a low molecular weight silanol endstopped diorganopolysiloxane polymer of which the viscosity of the polymer is less than 100 centipoise at 25° C. To this mixture there is added anywhere from 5 to 500 parts per million of potassium hydroxide catalyst and the mixture is heated at temperatures above 150° C. for a period of time varying anywhere from 1 hour to 24 hours to preferentially form the silanol terminated diorganopolysiloxane base polymer of the instant case. When the equilibration reaction has reached completion, that is when as much of the linear polymer is being formed as there is of the linear polymer breaking up to form the cyclopolysiloxanes then there may be added to the reaction mixture a mild acid to neutralize the base catalyst. The reaction mixture is then cooled. After the catalyst is neutralized the unreacted cyclics are vented off and the reaction mixture is cooled to room temperature to give the linear diorganopolysiloxane base polymer of the instant case.

It should be noted that the final molecular weight of the silanol base polymer that is formed will depend on both the molecular weight and the amount of silanol in the low molecular silanol containing fluid, that is added as a chainstopper. The more silanol chainstopper fluid that is added to the reaction mixture, the lower the final molecular weight of the polymer that is formed. The less the silanol content and the relative amount of the silanol chainstopper that is added to the reaction mixture, the higher the molecular weight of the silanol base polymer that is finally formed.

It also should be noted that the unreacted cyclics that are stripped off from the final neutralized linear silanol endstopped diorgano polysiloxane base polymer may be utilized in the subsequent polymerization step with new amounts of cyclopolysiloxanes so as to form additional amounts of the desired silanol base polymer.

Finally, as the catalyst there is utilized anywhere from 10 to 500 aprts per million of a rhodium complex wherein the concentration of the rhodium complex catalyst given above is expressed in terms of rhodium metal. More preferably the rhodium complex catalyst is utilized at a concentration of 50 to 250 parts per million of rhodium metal.

It should be noted that rhodium metal as such cannot be utilized as a catalyst in the compositions of the instant case but must be a solubilized form of rhodium. That is the rhodium must be in a form of a complex with some organic enhances the activity of the catalyst and which also solubilizes the rhodium catalyst in the mixture of silicone ingredients in which it is utilized. One type of rhodium catalyst which may be utilized has the following formula, $$Rh_2(CO)_4X_2 \tag{4}$$

where X is halogen and preferably chlorine. A more preferred rhodium complex catalyst is one of the formula $$Rh\ X_3(R_2S)_3 \tag{5}$$

where R is an alkyl radical from 4 to 12 carbon atoms and X is selected from the class consisting of chlorine and bromine and is more preferably chlorine.

It is not preferred that the R group in such formula have more than 12 carbon atoms, since such a complex catalyst where the alkyl group R is more than 12 carbon atoms is unstable and will decompose upon standing. It is also undesirable that the alkyl group be below 4 carbon atoms, since the rhodium complex catalyst is not as soluble as would be desired in the hydride cross-linking agent and the silanol base polymer. For maximum effectiveness, it has been found desirable that the alkyl group, the R group, in the rhodium complex catalyst of Formula 5 be from 4 to 8 carbon atoms with most preferably the R grouping from 6 to 8 carbon atoms.

It is also preferred that the rhodium complex be stored in methanol at the lower molecular weight of such complexes and at the higher molecular weight of such complexes within the scope of the above Formulas be stored in hexane. Ethanol is not considered a preferred solvent for such rhodium complexes since it will cause decomposition over a long period of time of such rhodium complexes into Rhodium metal. Accordingly, for the lower molecular weight Rhodium complexes it is preferred that they be dissolved in methanol and then if necessary be transferred into hexane where they're easily soluble even at the high molecular weights, that is when R in the formula is equal to 12 carbon atoms or more. The foregoing solution may then be utilized to transfer the rhodium complex catalyst into the silicone compositions of the instant case. The carbonyl rodium complexes having the general formula (4) are well-known substitutes and may be prepared is described in the Journal of the Chemical Society, 1965, p. 1900. The sulfide rhodium complexes which are shown in formula 4 are the preferred rhodium complexes of the instant case and are obtained or prepared by simplification of the synthesis described by Ferguson, et al, J. Chemical Society, 1965, P. 2617.

Accordingly, the general modified procedure for producing such rhodium complexes comprise taking rhodium trichloride hydrate, dissolving it in methanol, then adding the stoichiometric amount of the alkyl sulfide to this mixture; that is the bis-alkyl sulfide can then be added slowly to the solution of the rhodium trichloride compound and the reactants refluxed for a period of time varying anywhere from 1 to 6 hours. If the reaction proceeds in accordance with the desired procedure there is obtained a change in the reaction ingredients of from a dark suspension to a clear red solution. After the reaction is completed, which reaction is carried out with refluxing, the reaction solution is cooled in an ice bed if the methanol solvent and then the methanol solvent is stripped off under vacuum. The residue which is an orange viscous fluid is the desired rhodium catalyst of Formula 4, above, when the bis-alkyl sulfide contains alkyl fragments of $C_4\ C_{12}$ chain length. Accordingly, to simplify the addition of the rhodium complex to the silicone ingredients of the instant case, it is preferred that the rhodium complex be then dissolved in a sufficient quantity of hexane so that there results a clear red solution containing 1% rhodium by weight based on the amount of starter material in the above process for forming the rhodium complex. It should be noted that the additional step is the purification of the alkyl sulfide complex of the rhodium (III) halides is not necessary in this procedure since this simplified procedure makes the manufacture and separation of the rhodium complex catalyst particularly easy.

The preferred rhodium complex catalyst of Formula 5 which may be utilized within the scope of the instant invention are as follows:

$$Rh\ Cl_3((C_4H_9)_2S)_3$$

$$Rh\ Cl_3((C_8H_{17})_2S)_3$$

It should be noted that there are no other ingredients in the compositions of the instant case other than the inhibitor compound. Thus, a filler is not necessary in the compositions of the instant case since a filler is normally used in a silicone composition to enhance tensile strength properties of the composition. Since tensile strength is not a requirement in the silicone release coatings of the instant case a filler is not added. Accordingly, to further enhance the properties of the paper treating composition of the instant case, there is added to the composition an inhibitor compound. It should be noted that the composition without an inhibitor compound would have a pot life of 2 to 4 hours before there is an undue increase in viscosity in the composition and gelling of the composition.

Accordingly, to obtain the desired shelf life for the composition that is desired in commercial paper release coating applications there may be utilized of anywhere from 0.1 to 10 parts by weight of an inhibitor compound and specifically one of the select group of inhibitor compounds per 100 parts by weight of the silanol endstopped base polymer, and more preferably there is utilized anywhere from 0.1 to 5 parts by weight of an inhibitor compound per 100 parts of the base silanol endstopped polymer. The most preferred inhibitor is a silanol endstopped diorganopolysiloxane polymer having from 5.5 to 14.1% by weight of silanol and a viscosity of 20 to 80 centipoise at 25° C. and where the organo groups of such silanol endstopped low molecular weight polymer are alkyl radicals of 1 to 8 carbon atoms and are more preferably methyl radicals.

It is preferred that the silanol endstopped inhibitor compound be a silanol diorganopolysiloxane having a silanol content of at least 5.5% minimum and more preferably having a silanol content of 7.3% to 14.1% by weight, its viscosity varying from 20 to 80 centipoise at 25° C. The silanol endstopped diorganopolysiloxane polymer is preferred as an inhibitor compound since it is compatible with the basic silicone system and is easily solubilized, and also because it is non-volatile and non-toxic.

The disadvantage of such an inhibitor compound is that it does not give as high an amount of inhibition to the composition as would be desired so that the composition would have the maximum pot life possible. It should be noted that above 10 parts by weight of the silanol inhibitor compound per 100 parts of silanol base polymer will result in the silanol inhibitor compound separating out from the system, such that the maximum concentration with which the silanol inhibitor compound can be utilized is 10 parts by weight. The most preferred silanol inhibitor compound is a linear dimethylpolysiloxane polymer which is silanol stopped and has the viscosity in the range of 25 to 40 centipoise at 25° C., and a silanol content in the range of 7.3 to 14.1%. Another inhibitor compound which can be used in the instant invention is a dialkylmaleate where the alkyl radical in such maleate contains from 1 to 8 carbon atoms and is most preferably ethyl. These dialkylmaleates are well-known compounds in the art. The diethylmaleates are preferably utilized in the range of anywhere from 0.1 to 2 part by weight based on a hundred parts of the silanol endstopped base polymer and it is more preferably utilized at a concentration of 0.5 to 1.5 per parts by weight based on 100 parts of the silanol base polymer. With respect to the silanol endstopped inhibitor compounds, it should be noted that such compounds are also well-known compounds in the art and are simply produced by the hydrolysis of the appropriate diorganodichlorosilane. At the same general concentration as the dialkylmaleates that is the concentration of anywhere from 0.1 to preferably an upper limit of 2 parts by weight of inhibitor compound per hundred parts of the base a silanol polymer there may be utilized as the inhibitor compound, an organic compound containing an acetylenic group. It has been found that any organic compound with an acetylenic group in it will function as an inhibitor in the compositions of the instant case. The preferred acetylenic compound is diethylacetylenedicarboxylate. Preferably such an inhibitor compound is utilized at a concentration of anywhere from 0.5 to 1.5 parts per 100 parts of the silanol base polymer. As stated previously, any organic compound with acetylenic group in it can be utilized as an inhibitor in the compositions of the instant-case. However, the preferred inhibitor is the diethylacetylenedicarboxylate. Other preferred inhibitor compounds are other alkyl diesters of 2-butynedioic acid such as dimethylacetylenedicarboxylate. The alkyl group in such dialkyl diesters of 2-butynedioic acid preferably contain from 1 to 8 carbon atoms. However, with respect to acetylenic compounds as mentioned previously, it is not intended in the instant case to be limited solely to the diethylacetylenedicarboxylate disclosed above, but it is the intention to disclose as an inhibitor compound in the compositions of the instant case any organic compound in the compositions of the instant case containing an acetylenic group. It should be noted with respect to the maleate compounds that the preferred inhibitor compound is diethylmaleate. It should be noted with respect to the maleates and carboxylates, that is the acetylenic containing organic compounds, that the upper concentration of the compounds in 2 parts per 100 parts of the base polymer is given only as a guide. The reason for such an upper limit of 2 parts in this case is due to the fact that such compounds are more effective inhibitors than the low molecular weight linear silanol stopped diorganopolysiloxane inhibitor compound, and as such can be used at lower levels with equal effectiveness as the low molecular weight linear silanol endstopped inhibitor compound. Another inhibitor compound that can be utilized at these low concentrations, that is at a concentration of from 0.1 to preferably 2 parts per 100 parts of the silanol base polymer is an olefinic carboxylic acid ester of an aliphatic alcohol with the aliphatic alcohol containing from 1 to 4 carbon atoms and the olefinic carboxylic acid containing from 3 to 10 carbon atoms. The preferred inhibitor compound coming within the scope of the above definition being vinyl acetate.

It should be noted that preferably the vinyl acetate of the olefinic carboxylic acid ester of an aliphatic alcohol may be utilized in a more preferable concentration of 0.5 to 5 parts of the base silanol containing polymer. It is of course understood that the acetylenic compounds and that the olefinic carboxylic acid esters as well as the maleates may be utilized at a concentration as high as 10 parts per 100 parts of the silanol base polymer. However, at these concentrations such inhibitor compounds would be utilized at higher quantities than is necessary thus resulting in unnecessary expense.

There may also be utilized an inhibitor compound in the compositions of the instant case at a concentration varying from 0.1 to preferably up to 2 or 3 parts per 100 parts of the base silanol polymer of an inhibitor compound which is an alkenylisocyanurate, where the alkenyl radical varies from 3 to 8 carbon atoms. It should be noted that the alkenylisocyanurate compound may be a silicone substituted compound, that is a silane may be added to one or 2 of the alkenyl groups, and preferably a silane containing hydrolyzable groups through an SiH olefin platinum catalyzed reaction. Such silane substituted alkenylisocyanurates will be just as effective as inhibitor compounds in the compositions of the instant case as the purely organic alkenyl isocyanurate inhibitor compounds. It should also be noted that in the dialkylmaleates, one of the alkyl groups can also be substituted by a silicone group, that is substituted by a silane with or without hydrolyzable radicals and that the silane substituted maleate will function as an inhibitor compound in the instant case.

It can also be appreciated that the organic compounds containing an acetylenic group in the compound will function effectively as an inhibitor in the compositions of the instant case. As stated previously any of these compounds, that is isocyanurates, maleates, the acetylenic compounds and the olefinic carboxylic acid esters may be utilized at a concentration of anywhere from 0.1 up to 2 parts and more preferably from 0.5 up to 1.5 parts per 100 parts of the silanol base polymer.

However, such inhibitor compounds may also be utilized at concentrations above 2 parts, such as 5 parts or 10 parts if prolonged shelf life is desired. The only difficulty with such a large amount of inhibitor is that the inhibitor will not decompose at a fast enough rate to obtain the proper cure rate of the release coating on the paper when it is processed through commercial paper release coating equipment.

It should be noted that the preferred isocyanurate in the alkenyl isocyanurate inhibitors is triallylisocyanurate. It should be noted that any combination of the above inhibitors may also be utilized. In such an inhibitor combination it is found suitable a combination composed of 0.5 parts of dialkylmaleate combined with one part of a low molecular weight silanol terminated dimethylpolysiloxane polymer having a viscosity in the range of 24-40 centipoise and a silanol content of at least 5.5% by weight.

Accordingly, the appropriate inhibitor compound or inhibitor combination will be utilized with the rhodium complex catalyst of the instant case in the silicone compositions of the instant cases to give the desired release coating properties to the composition and specifically so that the pot life and the curing properties of the composition will be suitable for commercial coating equipment. Accordingly, utilizing the above composition there is obtained a release coating which has good release properties and does not exhibit rub off or migration and which has a useful pot life at room temperature, that is it will undergo at least a 12 hour period with a viscosity increase of up to 50% or less and will cure at temperatures in the range of 300° to 500° F. in a period of time of generally of 5 to 60 seconds and more preferably at a period of time of 5 to 30 seconds. The release coatings of the instant case may be employed to provide a release surface for a wide range of substrates; as for example aluminum, cross-linked polyethylene and polyethylene. The compositions are particularly applicable to the treatment of various types of paper; e.g. Kraft, glassine and vegetable parchment. Application of the composition to the substrate may be carried out employing any suitable technique. For example, by immersion, doctor blade or gravure or plain roll. The quantity of composition applied to the clear surface is not critical and may be varied between wide limits. For most purposes it is preferred to adjust the coating conditions to achieve an add on of about 0.2 to 4.0 grams of composition per square meter of surface. For commercial application the applied composition is cured preferably by the application of heat. The cure conditions employed will vary to some extent depending on the proportion of which the catalyst is employed and the amount and type of inhibitor and on the nature of the substrate.

Generally, for catalyst levels corresponding about 200 parts per million of rhodium based on the composition, the exposure of the cooler substrate to a temperature in the range of from 300° to 500° F. for a period of 5 to 60 seconds is sufficient to achieve a satisfactory degree of cure. Examples below are given for the purpose of illustrating the practice of the present invention. They are not given for any purpose to set limitation or boundaries to the definition of the invention as set forth in the instant specification. All parts are by weight. For utilization in the Examples there was prepared a rhodium catalyst which was prepared by taking 4.0 grams of $(RhCl_3 \cdot 3H_2O)$ which was dissolved in 300 milliliters of methanol in a 1 liter flask equipped with a reflux condenser. A stoichimetric amount of bis-n-octylsulfide (14.0 milliliters, $4.56 \times 10^{-2}$ mole) was pipetted into the methanolic rhodiumtrichloride solution, and the reactants refluxed for $2\frac{1}{2}$ hours. During the course of this reaction, the appearance of the reaction mixture slowly changed from a dark suspension to a clear, deep red solution. After refluxing the reaction the solution was cooled in an ice bath, and the methanol solvent removed in vacuo on a rotary evaporator. The residue, $Rh[(n-C_8H_{17})_2S]_3Cl_3$ was an orange viscous fluid which could not be crystallized even at dry ice temperatures. The foregoing complex was utilized in the experiments set forth in the Examples below.

EXAMPLE I

In the examples below there was utilized a silanol endstopped linear dimethylpolysiloxane polymer as the base polymer which and a viscosity of 600 centipoise at 25° C. To this there was added in given amounts in Table I below of a low molecular amount silanol endstopped dimethylpolysiloxane polymer having a viscosity of 25 to 47 centipoise at 25° C. and a silanol content of 10.0%. The blend of the two materials was then treated with sufficient amounts of the catalyst solution described above to provide known concentrations of from 50 to 200 parts per million of rhodium as rhodium metal in silicone fluids. The solvent for the catalyst (hexane or methanol), was removed from the silicone mixture by heating the mixture to 50° C. under vacuum.

The coating baths were prepared by mixing 10 parts of the silanol polymer containing the rhodium condensation catalyst and the low molecular weight silanol end-stopped dimethylpolysiloxane inhibitor compound if there was any of such a compound in the blend as indicated in Table I below with one part of a methyl hydrogen cross-linking agent which comprised a polymer of 25 cps viscosity having trimethyl silyl chainstopping units and methyl hydrogen siloxy polymer chain units, which polymer had a hydrogen content of 1.67% by weight. The complete coating composition was applied to 40 lb. super calendar craft paper with a doctor blade and the silicone coating cured to a smear and migration free abhesive surface in a forced air oven. The minimum oven dwell time required for cure as the function of temperature provided the measure of cure performance for a particular experimental blend. The catalyzed pot life of the coating bath was ascertained by monitoring the increase in viscosity of the silicone mixture as a function of time following the addition of 1 part hydride fluid to 10 parts of silanol fluid. Viscosities were measured on a Brookfield LVF Device at 75° F. In the Table below, Table I Gel time defines the time required for the viscosity of a catalyzed coating bath to exceed 50,000 cps at room temperature. In Table I, below the silanol containing base polymer is Fluid A and the low molecular weight silanol chainstopped dimethylpolysiloxane inhibitor compound is Fluid B. There is set forth in Table I below the performance of the composition utilizing various amounts of Fluid B in the composition versus various amounts of the rhodium complex catalyst. The results of such experiments are set forth in Table I, below, which are as follows:

previous example.) These blends constituted the silanol base polymer. To each base polymer blend sufficient quantity of $RhCl_3[(n-C_8H_{17})_2S]_3$ catalyst was added to furnish 200 ppm Rh in the manner previously described. Following addition of the rhodium catalyst to the base polymers, diethylmaleate inhibitor was added and the complete blends stirred until uniform. Cure performance and pot life of these experimental compositions were then ascertained as described previously. The particular blends, along with their respective cure and pot life characteristics, are displayed in Table II.

TABLE II

| Blend | Fluid A % | Fluid B % | Diethyl-maleate % | Minimum Cure Time, 300° F., sec. | Cure Time, 250° F., sec. | Initial Catalysed viscosity, cps. 75° F. | 6 Hrs. Catalysed viscosity, cps. 75° F. | Gel Time Hrs. |
|---|---|---|---|---|---|---|---|---|
| XVI | 100 | 0 | 0.5 | 25 | 60 | 390 | 450 | >24 |
| XVII | 99 | 1 | 0.5 | 35 | 80 | 450 | 481 | >24 |
| XVIII | 99.5 | 0.5 | 0.5 | 35 | 55 | 440 | 488 | >24 |
| XIX | 99.5 | 0.5 | 0.25 | 30 | 50 | 440 | 490 | >24 |
| XX | 99.5 | 0.5 | 0.12 | 30 | 50 | 462 | 510 | >24 |
| XXI | 99.75 | 0.25 | 0.12 | 25 | 50 | 465 | 525 | >24 |

Examination of this test data shows that not only is diethylmaleate (DEM) by itself a good inhibitor for these solvent-free rhodium-catalyzed silanol—SiH condensation cured paper release compositions described in this patent application, but that combinations of the low-viscosity silanol chainstopped polydimethylsiloxane inhibitor (described in the previous example) with diethylmaleate function particularly well in furnishing long stable pot life without slowing the rate of cure unacceptably. In particular, use of the low-viscosity silanol chainstopped polydimethylsiloxane inhibitor in tandem with diethylmaleate permits the use of much smaller amounts of both of these inhibitors than would be required to furnish equally long pot life were either substance to be used alone.

EXAMPLE III

Experimental compositions were prepared in which 200 ppm Rh from $RhCl_3[(n-C_8H_{17})_2S]_3$ catalyst was dissolved in silanol base polymer as described in the previous examples. Diethylacetylenedicarboxylate (DEAD) was then added, and the cure and pot life

TABLE 1

| Blend | Fluid A, % | Fluid B, % | Rhodium, ppm | Minimum Cure Time, Sec. at 300° F. | Minimum Cure Time, Sec. at 250° F. | Initial Catalysed Viscosity, cps. at 75° F. | 3 Hr. Catalysed Viscosity, cps. at 75° F. | Gel Time Hrs. |
|---|---|---|---|---|---|---|---|---|
| I | 100 | 0 | 200 | 20 | 40 | 335 | 525 | 10 |
| II | 100 | 0 | 150 | 20 | 40 | 372 | 520 | 12 |
| III | 100 | 0 | 100 | 20 | 60 | 325 | 376 | >24 |
| IV | 99 | 1 | 200 | 20 | 40 | 393 | 446 | 18 |
| V | 99 | 1 | 150 | 25 | 60 | 393 | 440 | >24 |
| VI | 99 | 1 | 100 | 35 | 120 | 378 | 454 | >24 |
| VII | 98 | 2 | 200 | 20 | 60 | 429 | 495 | >24 |
| VIII | 98 | 2 | 150 | 25 | 70 | 391 | 443 | >24 |
| IX | 98 | 2 | 100 | 40 | 120 | 373 | 418 | >24 |
| X | 97 | 3 | 200 | 20 | 60 | 357 | 404 | >24 |
| XI | 94 | 6 | 200 | 30 | 50 | 394 | 411 | >48 |
| XII | 94 | 6 | 150 | 30 | 50 | 457 | 471 | >24 |
| XIII | 94 | 6 | 100 | 50 | 90 | 340 | 350 | >48 |
| XIV | 94 | 6 | 50 | (NO CURE >180 SEC) | | | Not Measured | |
| XV | 90 | 10 | 200 | 20 | 60 | 350 | 365 | >48 |

EXAMPLE II

In the Examples cited below there were utilized blends of a silanol endstopped linear dimethylpolysiloxane polymer of viscosity 600 cps (Fluid A) with varying amounts of a low molecular weight silanol endstopped dimethylpolysiloxane (Fluid B) (as described in the previous example.) These blends constituted the silanol performances of the complete blends ascertained as described above. Observed results are displayed in Table III.

EXAMPLE IV

Experimental compositions were prepared in which 200 ppm Rh from RhCl₃[(n—C₈H₁₇)₂S]₃ catalyst was dissolved in silanol base polymer as described in the previous examples. Triallylisocyanurate (TAIC) was then added, and the cure and pot life performances of the complete blends ascertained as described above. Observed results are displayed in Table III.

EXAMPLE V

Experimental compositions were prepared in which 200 ppm rhodium from RhCl₃[(n—C₈H₁₇)₂S]₃ catalyst was dissolved in silanol base polymer as described in the previous examples. Vinyl acetate (ViOAc) was then added, and the cure and pot life performances of the complete blends determined as described above. Observed results are shown in Table III.

TABLE III

| Blend | Fluid A % | Fluid B % | Inhibitor % | Cure Sec., 300° F. | Cure Sec., 250° F. | Initial catalysed Viscosity cps. 75° F. | 6 Hr. catalysed Viscosity, cps, 75° | Gel Time Hrs. |
|---|---|---|---|---|---|---|---|---|
| XXII | 100 | 0 | DEAD, 0.5 | 25 | 60 | 375 | 418 | 48 |
| XXIII | 99.5 | 0.5 | DEAD, 0.12 | 30 | 50 | 400 | 455 | 24 |
| XXIV | 100 | 0 | TAIC, 0.5 | 25 | 60 | 390 | 480 | 24 |
| XXV | 99.5 | 0.5 | TAIC, 0.12 | 30 | 55 | 405 | 530 | 18 |
| XXVI | 100 | 0 | ViOAc, 0.5 | 25 | 55 | 394 | 445 | 24 |
| XXVII | 99.5 | 0.5 | VIOAC, 0.12 | 30 | 60 | 395 | 480 | 24 |

It can be concluded from the foregoing Examples that a silanol stopped linear polydimethylsiloxane of viscosity 25-47 cps at ambient conditions, either alone or in combination with diethylmaleate, diethylacetylenedicarboxylate, triallylisocyanurate, or vinyl acetate, acts as an effective inhibitor in rhodium catalyzed condensation cured solventless paper release compositions in which the silanol stopped linear dimethylpolysiloxane base polymer of the compositions is crosslinked by methylhydrogenpolysiloxane polymer at elevated temperatures to form a smear and migration-free abhesive release coating on cellulosic substrates. It can further be stated that DEM, DEAD, TAIC, and vinyl acetate will also function as effective one-part inhibitors for these compositions.

I claim:

1. Silicone rubber release coating composition with a good shelf life for coating plastic and cellulosic substrates comprising (a) 100 parts by weight of silanol end-stopped diorganopolysiloxane polymer having 100 to 1,000 centipoise viscosity at 25° C. where the organo groups are selected from the class consisting of alkyl radicals of 1 to 8 carbon atoms and mixturees thereof; (b) from 1 to 20 parts by weight of a silicone hydride having from 0.5 to 1.6% by weight of hydrogen and viscosity varying from 5 to 200 centipoise at 25° C.; (c) from 10 to 500 parts per million as rhodium metal of a rhodium complex catalyst of the formula, $$RhX_3(R_2S)_3$$

where R is an alkyl radical that has from 4 to 12 carbon atoms and X is selected from the class consisting of chlorine and bromine; and (d) from 0.1 to 10 parts by weight of an inhibitor compound selected from the class consisting of (1) a dialkyl maleate where the alkyl radical contains from 1 to 8 carbon atoms; (2) a compound containing an acetylenic group; (3) a olefinic carboxylic acid ester of aliphatic alcohols where the aliphatic alcohol contains from 1 to 4 carbon atoms and the olefinic carboxylic acid contains from 3 to 10 atoms; and (4) a alkenyl isocyanurate wherein the alkenyl groups contains from 3 to 8 carbon atoms and mixtures thereof.

2. The composition of claim 1 wherein the silicone hydride has the formula,

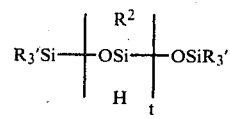

where R' is selected from the class consisting of alkyl radicals of 1 to 8 carbon atoms and a mixture of hydrogen and alkyl radicals of 1 to 8 carbon atoms and R² is an alkyl radical of 1 to 8 carbon atoms and t varies such that the polymer has a viscosity varying from 5 to 200 centipoise at 25° C.

3. The composition of claim 1 wherein the silicone hydride has the formula, $$(R^3HSiO)_4$$

wherein R³ is an alkyl radical of 1 to 8 carbon atoms.

4. The composition of claim 1 wherein the rhodium catalyst has the formula, $$RhCl_3[(C_4H_9)_2S]_3.$$

5. The composition of claim 1 wherein the rhodium catalyst has the formula, $$RhCl_3[(C_8H_{17})_2S]_3.$$

6. The composition of claim 1 wherein the inhibitor compound is diethylmaleate.

7. The composition of claim 1 wherein the inhibitor compound is diethylacetylenedicarboxylate.

8. The composition of claim 1 wherein the inhibitor compound is vinyl acetate.

9. The composition of claim 1 wherein the inhibitor compound is triallylisocyanurate.

10. The composition of claim 1 wherein the inhibitor compound is a mixture of diethylmaleate and a linear silanol end-stopped dimethylpolysiloxane having a viscosity of 25 to 60 centipoise at 25° C. and a silanol content varying from 7.3 to 14.1% by weight.

11. A process for forming a silicone rubber release coating composition with a good shelf life for coating plastic and cellulosic substrates comprising (i) mixing (a) 100 parts by weight of silanol end-stopped diorganopolysiloxane polymer having 100 to 1,000 centipoise viscosity at 25° C. where the organo groups are selected from the class consisting of alkyl radicals, fluoroalkyl radicals of 1 to 8 carbon atoms and mixturees thereof; (b) from 1 to 20 parts by weight of a silicone hydride having from 0.5 to 1.6% by weight of hydrogen and viscosity varying from 5 to 200 centipoise at 25° C.;

(c) from 10 to 500 parts per million as rhodium metal of a rhodium complex catalyst of the formula,

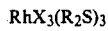

where R is an alkyl radical that has from 4 to 12 carbon atoms and X is selected from the class consisting of chlorine and bromine; and (d) from 0.1 to 10 parts by weight of an inhibitor compound selected from the class consisting of (1) a dialkyl maleate where the alkyl radical contain from 1 to 8 carbon atoms; (2) a compound containing an acetylenic group; (3) a olefinic carboxylic acid ester of aliphatic alcohols where the aliphatic alcohol contains from 1 to 4 carbon atoms and the olefinic carboxyic acid contains from 3 to 10 atoms; and (4) a alkenyl isocyanurate wherein the alkenyl groups contains from 3 to 8 carbon atoms and mixtures thereof; and (ii) curing the mixture by heating it at a temperature in the range of 300°-500° F. for 5 to 60 seconds.

12. The process of claim 11 wherein the silicone hydride has the formula,

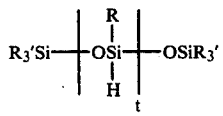

wherein R' is selected from the class consisting of alkyl radicals of 1 to 8 carbon atoms and a mixture of hydrogen and alkyl radicals of 1 to 8 carbon atoms and $R^2$ is an alkyl radical of 1 to 8 carbon atoms and 6 varies such that the polymer has a viscosity varying from 5 to 200 centipoise at 25° C.

13. The process of claim 11 wherein the silicone hydride has the formula,

wherein $R^3$ is an alkyl radical of 1 to 8 carbon atoms.

14. The process of claim 11 wherein the rhodium catalyst has the formula,

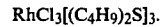

15. The process of claim 11 wherein the rhodium catalyst has the formula,

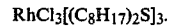

16. The process of claim 11 wherein the inhibitor compound is diethylmaleate.

17. The process of claim 11 wherein the inhibitor compound is diethylacetylenedicarboxylate.

18. The process of claim 11 wherein the inhibitor compound is vinyl acetate.

19. The process of claim 11 wherein the inhibitor compound is triallylisocyanurate.

20. The process of claim 11 wherein the inhibitor compound is a mixture of diethylmaleate and a linear silano end-stopped dimethylpolysiloxane having a viscosity of 25 to 60 centipoise at 25° C. and a silanol content varying from 7.3 to 14.1% by weight.

21. A substrate with a silicone release coating thereon comprising (i) a substrate selected from the class consisting of cellulosic and plastic substrates over which is applied a coating of (ii) (a) 100 parts by weight of silanol end-stopped diorganopolysiloxane polymer having 100 to 1,000 are selected from the class consisting of alkyl radicals, fluoroalkyl radicals of 1 to 8 carbon atoms and mixtures thereof; (b) from 1 to 20 parts by weight of a silicone hydride having from 0.5 to 1.6% by weight of hydrogen and viscosity varying from 5 to 200 centipoise at 25° C.; (c) from 10 to 500 parts per million as rhodium metal of a rhodium complex catalyst of the formula,

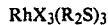

where R is an alkyl radical that has from 4 to 12 carbon atoms and X is selected from the class consisting of chlorine and bromine; and (d) from 0.1 to 10 parts by weight of an inhibitor compound selected from the class consisting of (1) a dialkyl maleate where the alkyl radical contains from 1 to 8 carbon atoms; (2) a compound containing an acetylenic group; (3) a olefinic carboxylic acid ester of aliphatic alcohols where the aliphatic alcohol contains from 1 to 4 carbon atoms and the olefinic carboxylic acid contains from 3 to 10 atoms; and (4) a alkenyl isocyanurate wherein the alkenyl groups contains from 3 to 8 carbon atoms and mixtures thereof.

22. The silicone coated substrate of claim 21 wherein the silicone hydride has the formula,

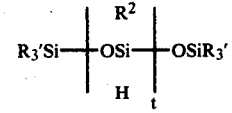

where R' is selected from the class consisting of alkyl radicals of 1 to 8 carbon atoms and a mixture of hydrogen and alkyl radicals of 1 to 8 carbon atoms and $R^2$ is an alkyl radical of 1 to 8 carbon atoms and t varies such that the polymer has a viscosity varying from 5 to 200 centipoise at 25° C.

23. The silicone coated substrate of claim 21 wherein the silicone hydride has the formula,

wherein $R^3$ is an alkyl radical of 1 to 8 carbon atoms.

24. The silicone coated substrate of claim 21 wherein the rhodium catalyst has the formula,

25. The silicone coated substrate of claim 21 wherein the rhodium catalyst has the formula,

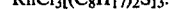

26. The silicone coated substrate of claim 21 wherein the inhibitor compound is diethylmaleate.

27. The silicone coated substrate of claim 21 wherein the inhibitor compound is diethylacetylenedicarboxylate.

28. The silicone coated substrate of claim 21 wherein the inhibitor compound is vinyl acetate.

29. The silicone coated substrate of claim 21 wherein the inhibitor compound is triallylisocyanurate.

30. The silicone coated substrate of claim 21 wherein the inhibitor compound is a mixture of diethylmaleate and a linear silanol end-stopped dimethylpolysiloxane having a viscosity of 25 to 50 centipoise at 25° C. and a silanol content varying from 7.3 to 14.1% by weight.

31. The process for applying a silicone release coating on a substrate comprising (i) applying to a substrate selected from the class consisting of a cellulosic substrates and plastics substrates silicone coating mixture of (a) 100 parts by weight of silanol end-stopped diorganopolysiloxane polymer having 100 to 1,000 centipoise viscosity at 25° C. where the organo groups are selected from the class consisting of alkyl radicals, fluoroalkyl radicals of 1 to 8 carbon atoms and mixtures thereof; (b) from 1 to 20 parts by weight of a silicone hydride having from 0.5 to 1.6% by weight of hydrogen and viscosity varying from 5 to 200 centipoise at 25° C.; (c) from 10 to 500 parts per million as rhodium metal of a rhodium complex catalyst of the formula, $RhX_3(R_2S)_3$ where R is an alkyl radical that has from 4 to 12 carbon atoms and X is selected from the class consisting of chlorine and bromine; and (d) from 0.1 to 10 parts by weight of an inhibitor compound selected from the class consisting of silanol end-stopped diorganopolysiloxane having 5.5 to 14.1% by weight silanol, a viscosity of 20 to 80 centipoise at 25° and where the organo groups are alkyl radicals of 1 to 8 carbon atoms; (1) a dialkyl maleate where the alkyl radical contains from 1 to 8 carbon atoms; (2) a compound containing an acetylenic group; (3) a olefinic carboxylic acid ester of aliphatic alcohols where the aliphatic alcohol contains from 1 to 4 carbon atoms and the olefinic carboxylic acid contains from 3 to 10 atoms; and (4) a alkenyl isocyanurate wherein the alkenyl groups contains from 3 to 8 carbon atoms and mixtures thereof; and (ii) heating said silicone mixture at a temperature in the range of 300° to 500° F. for 60 seconds.

* * * * *